March 29, 1927.
P. NORDENFELT ET AL
MACHINE FOR MAKING CIGAR ROLLS
Filed Oct. 20, 1923   7 Sheets-Sheet 1
1,622,966
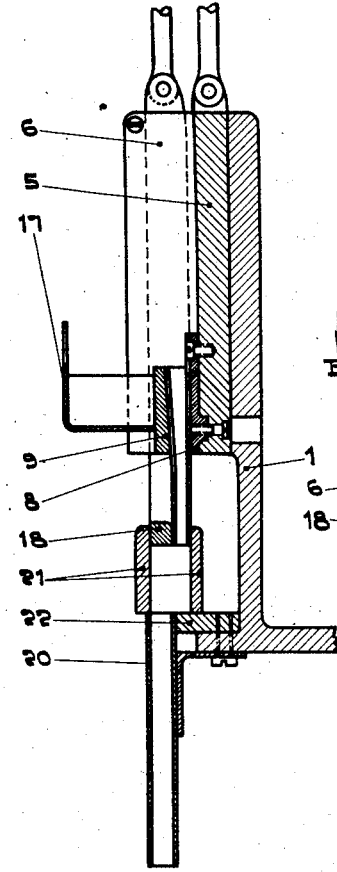
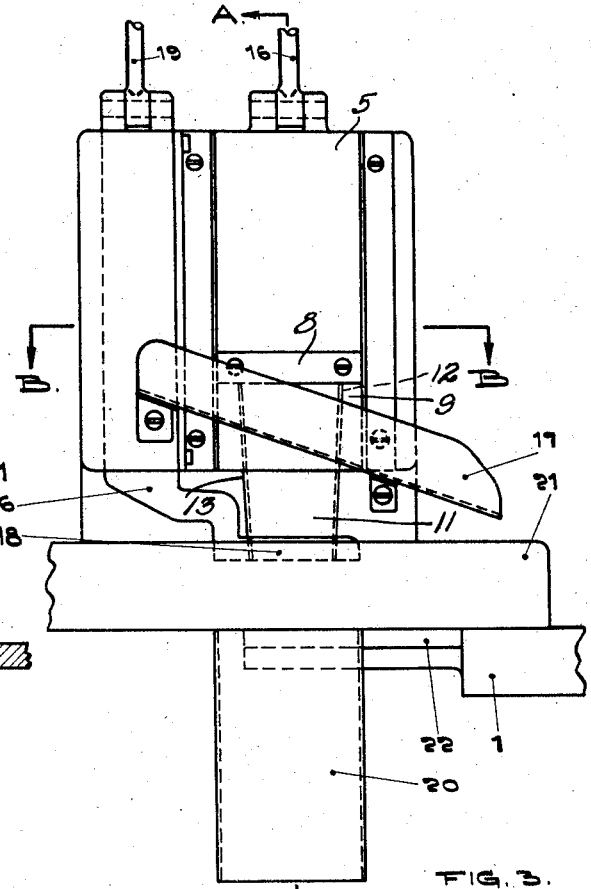
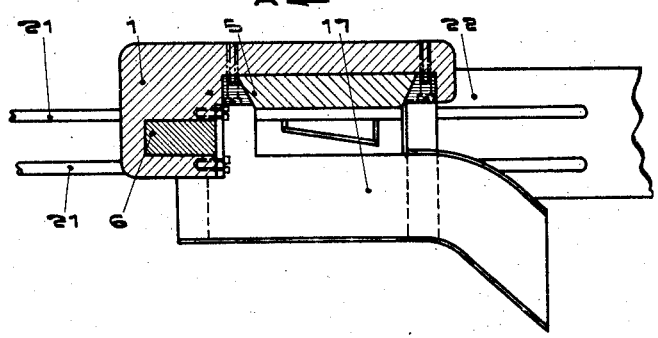
INVENTORS
PER NORDENFELT
ERIK GRANSTEDT
BY
ATTORNEY March 29, 1927.
P. NORDENFELT ET AL
1,622,966
MACHINE FOR MAKING CIGAR ROLLS
Filed Oct. 20, 1923
7 Sheets-Sheet 2
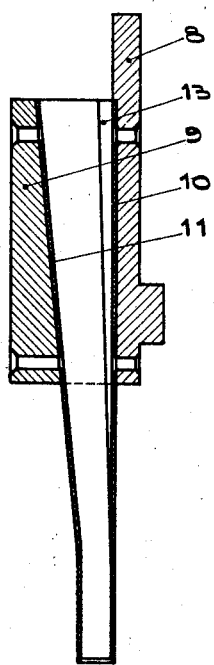
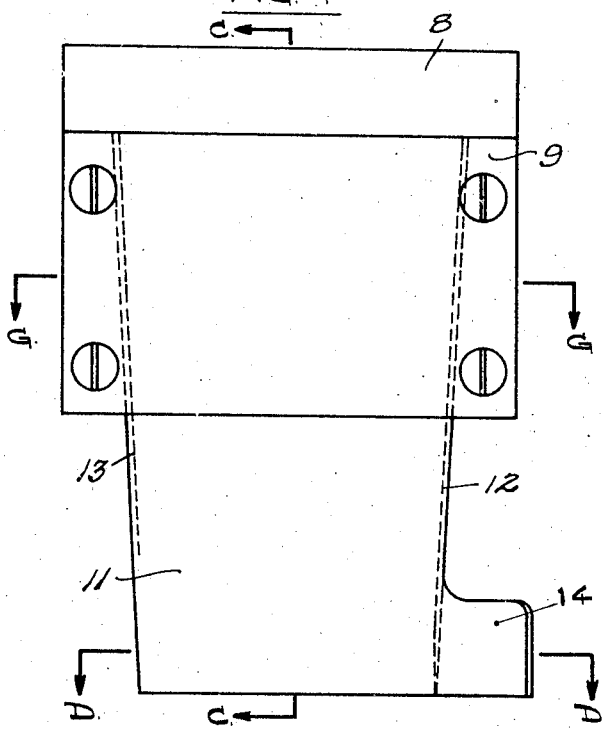
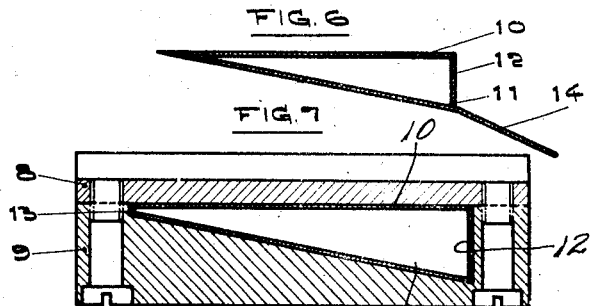
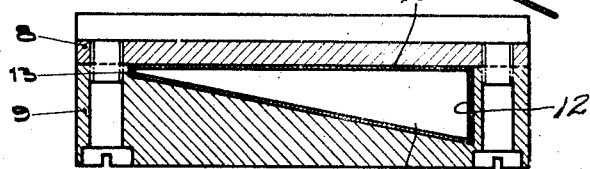
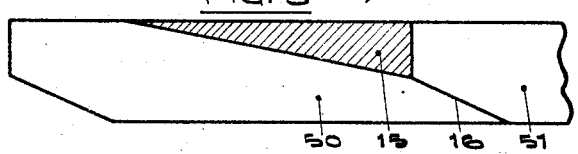
INVENTORS
PER NORDENFELT
ERIK G RANSTEDT
BY
ATTORNEY March 29, 1927.
P. NORDENFELT ET AL
1,622,966
MACHINE FOR MAKING CIGAR ROLLS
Filed Oct. 20, 1923   7 Sheets-Sheet 3
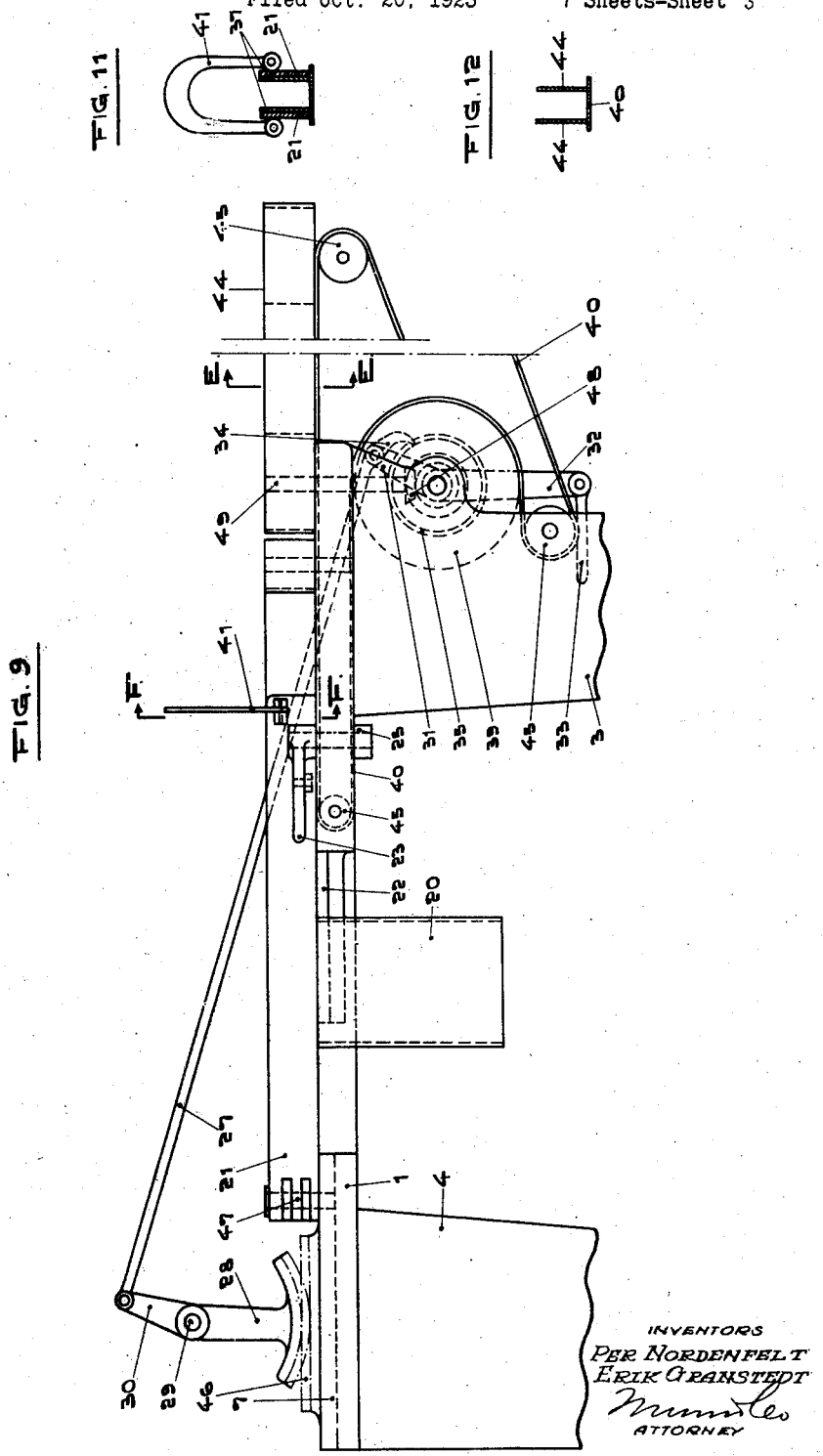
INVENTORS
PER NORDENFELT
ERIK GRANSTEDT
ATTORNEY

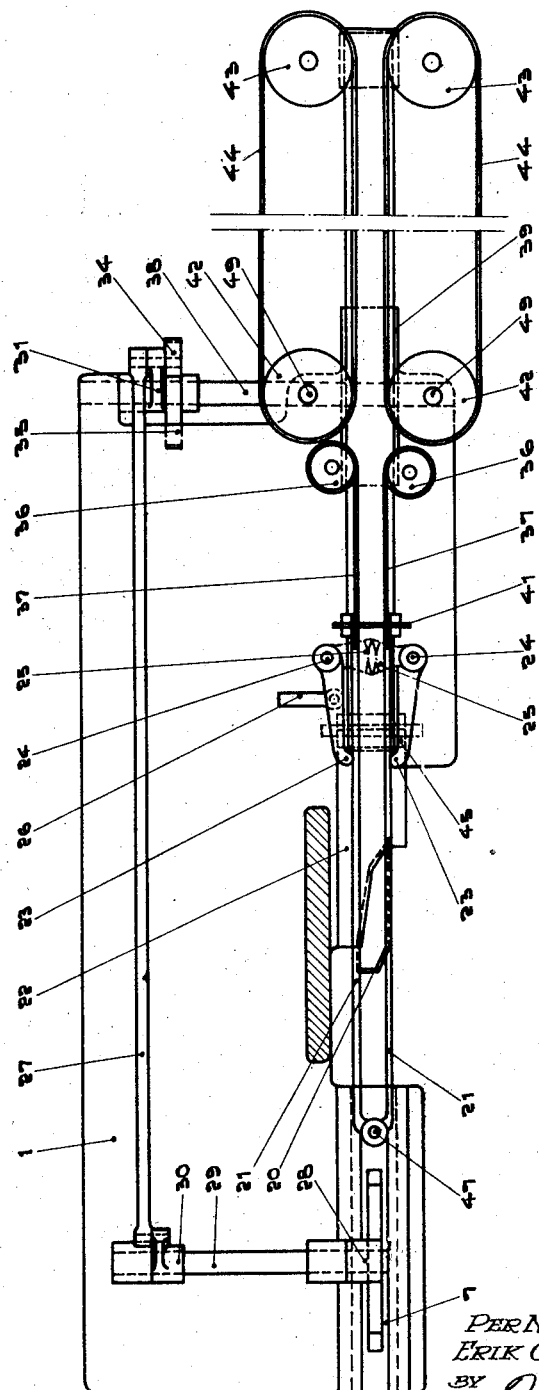

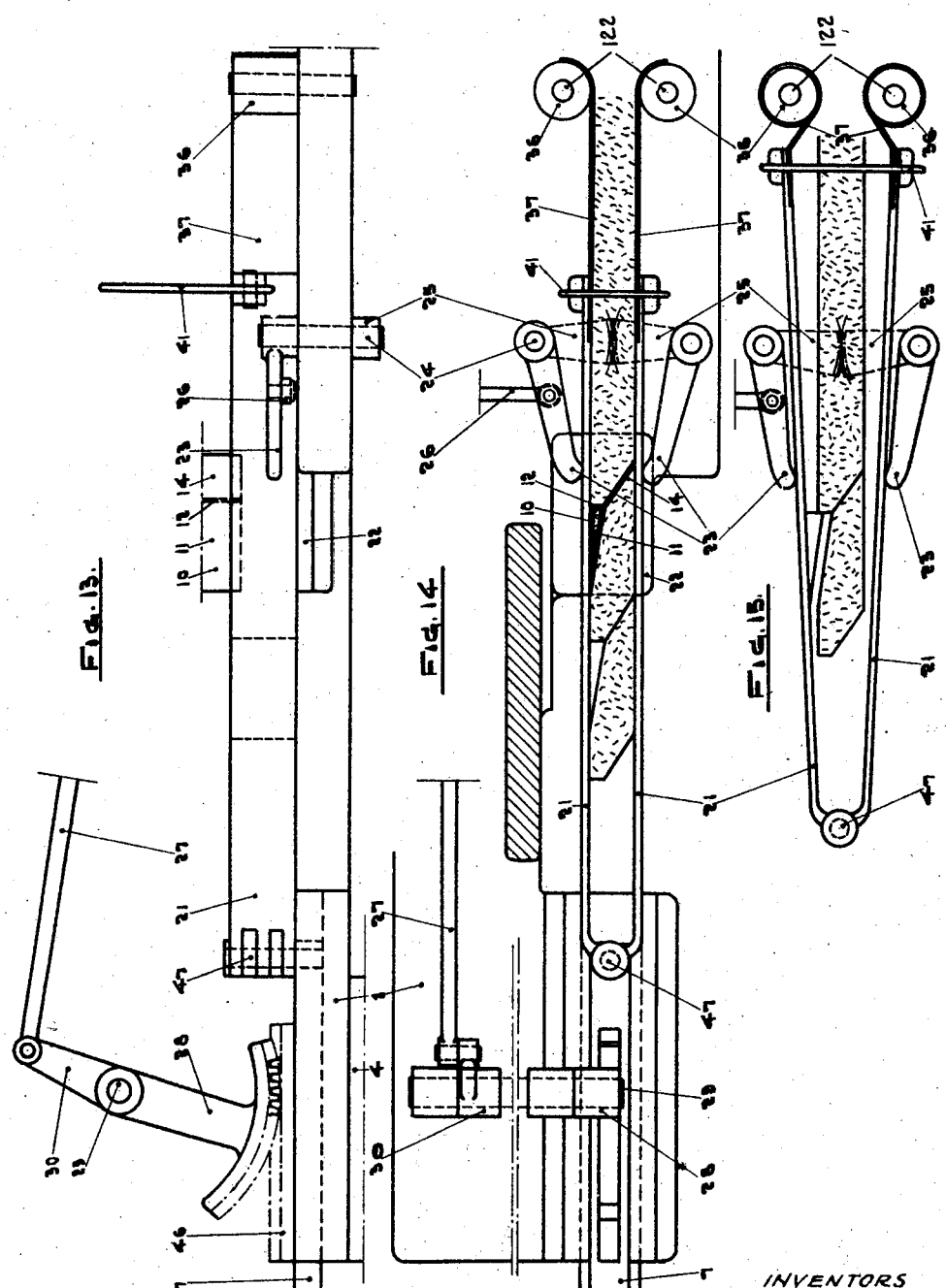

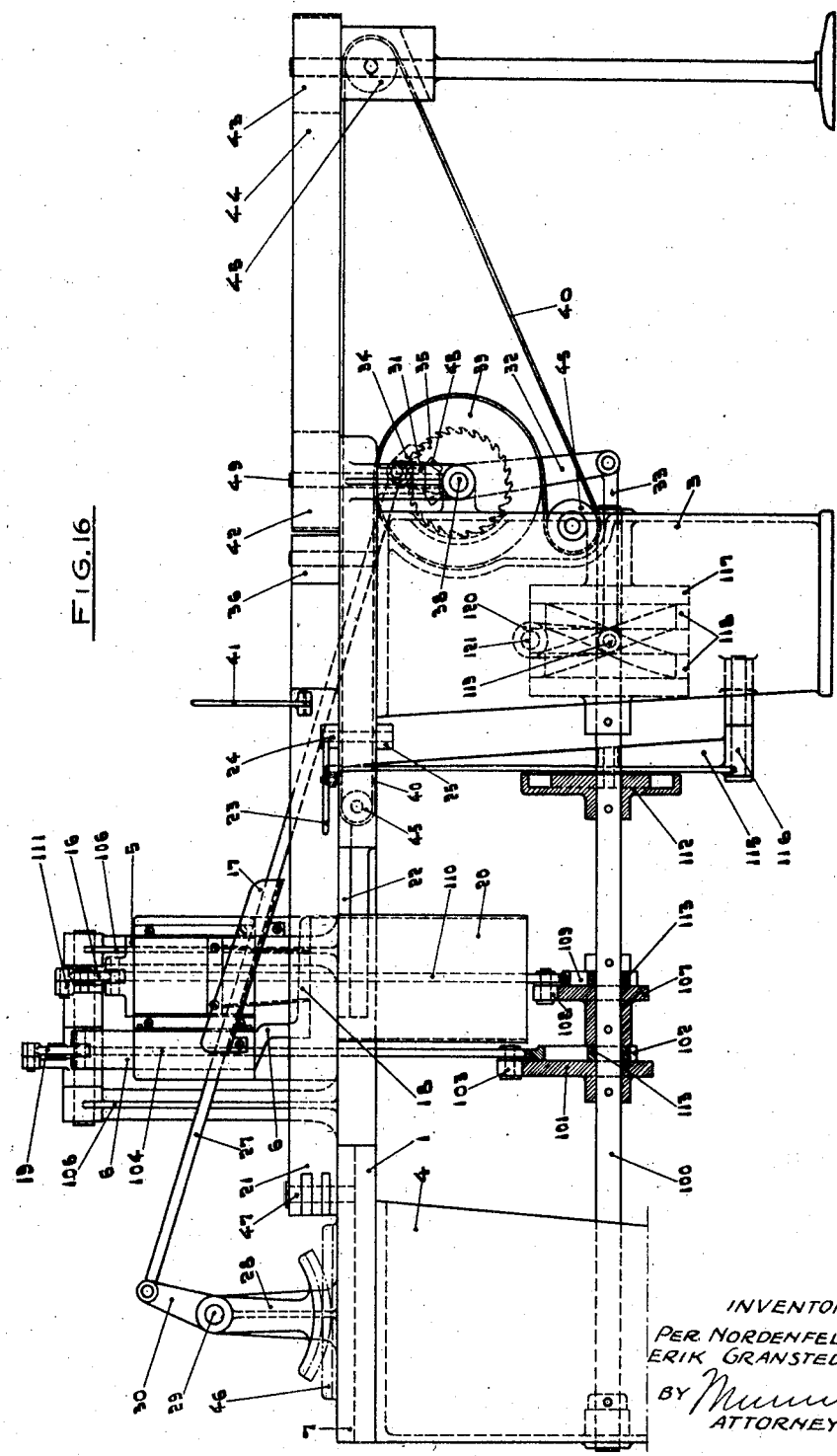

March 29, 1927.
P. NORDENFELT ET AL
1,622,966
MACHINE FOR MAKING CIGAR ROLLS
Filed Oct. 20, 1923     7 Sheets-Sheet 7
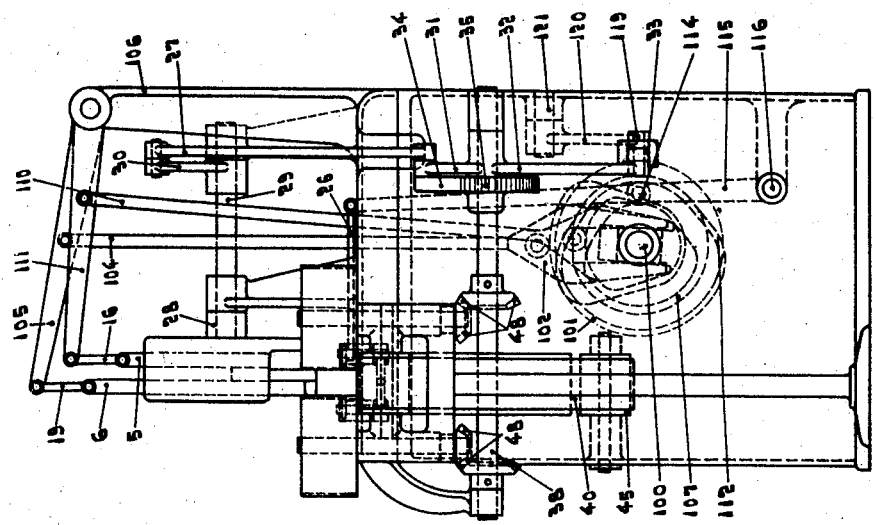
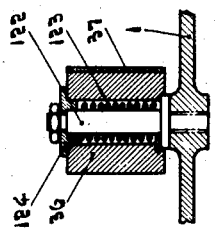
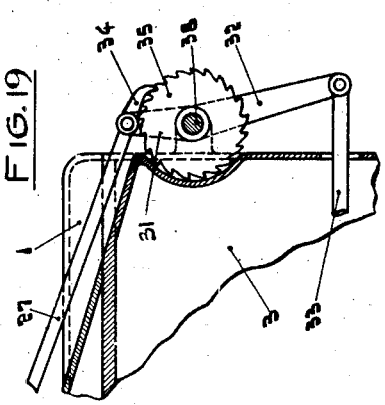
INVENTORS
PER NORDENFELT
ERIK GRANSTEDT
BY
ATTORNEYS Patented Mar. 29, 1927.

1,622,966

UNITED STATES PATENT OFFICE.

PER NORDENFELT AND ERIK GRANSTEDT, OF STOCKHOLM, SWEDEN, ASSIGNORS TO AKTIEBOLAGET FORMATOR, OF STOCKHOLM, SWEDEN, A CORPORATION.

MACHINE FOR MAKING CIGAR ROLLS.

Application filed October 20, 1923, Serial No. 669,805, and in Sweden May 4, 1923.

This invention relates to a machine for manufacturing cigar rolls, and particularly to the separating from a string of tobacco of the filler adapted for a roll and to the removal of excess tobacco in making shaped cigars.

The invention consists chiefly in this that the tobacco string having in known manner a thickness corresponding substantially to that of the roll to be produced is caught by a catching device and moved by said device to a cutting tool, which separates the filler tobacco adapted for the roll, while the tobacco, which will in some cases on account of the shape of the roll be superfluous, is removed by means of the said cutting tool. To that last-mentioned end the cutting tool may, preferably, be provided with a sleeve or casing, through which the excess tobacco is led automatically during the cutting operation and from which the said tobacco may be easily removed.

In the annexed drawings one form of embodiment of a machine according to the invention is shown. Fig. 1 shows the details for forming the roll filler, viewed from above. Fig. 2 is a section along the line A—A and Fig. 3 a section along the line B—B of Fig. 1. Fig. 4 shows on an enlarged scale a front view of the cutting tool. Fig. 5 is a section along the line C—C, Fig. 6 a section along the line D—D and Fig. 7 a section along the line G—G of Fig. 4. Fig. 8 is a schematical view showing the cutting of the string. Fig. 9 is a side view of the machine, some of the details shown in Figs. 1 to 7 being removed. Fig. 10 is a top view of the machine according to Fig. 9. Fig. 11 is a section along the line F—F and Fig. 12 a section along the line E—E of Fig. 9.

Figure 13 shows from the side and on a larger scale the gripping device and adjacent parts, Figure 14 shows the same from above, Figure 15 shows the gripping device in open position and seen from above, Figure 16 is a side view of the complete machine, Figure 17 is a front view thereof, Figure 18 is a sectional view on a larger scale of one of the spring-actuated rollers for maintaining the bands connected with the gripping device stretched, Figure 19 shows another detail.

On the machine frame 1 resting on pedestals 3, 4, Fig. 9, are displaceably arranged in vertical direction two slides 5 and 6, the slide 5 carries the cutting tool 10—14, Figs. 4—7, and obtains by a rod 16, Fig. 1, the desired reciprocating movement in any suitable manner, while the slide 6, which obtains the desired movement by means of a rod connection 19, carries a piston 18 adapted to move, after the roll filler has been cut off, the said filler into a sleeve 20 secured to the machine frame 1 and having an interior form corresponding to the form of the piston 18 and of the cut off roll filler.

The cutting sleeve secured to the slide 5 consists of thin plates 10 and 11, the plate 10 of which is provided at the one side with an extension 12 bent along the whole length of the plate and at the other side with an extension 13 bent along part of the length. The said plates having cutting edges at the lower end are, as apparent from Fig. 5, riveted to plates 8 and 9 and will, when screwing together said plates, Figs. 4 and 7, be tightly pressed against each other having the extensions 12 and 13 resting on the plate 11, so as to form a sleeve open at both ends and widening in the direction from the bottom towards the top. By this the cutting sleeve will be considerably simpler and cheaper in manufacturing than a solid sleeve. Further, the plate 11 is provided with an extension 14, Figs. 4 and 6, forming that part of the cutting tool, by which the roll filler will be cut off from the string.

The filler leaves forming the string are placed on a conveyer device mounted on the machine frame 1, said conveyer device consisting, for one thing, of an endless band 40 running over a driving roller 39 and guide rollers 45 and, for the other, of two endless bands 44 running over rollers 42 and 43, said latter bands forming, as apparent from Fig. 12, together with the band 40 a movable conveyer channel. The band 40 obtains its movement from the driving roller 39, on the shaft 38 on which a ratchet wheel is secured cooperating with a pawl 34 pivotally connected to a double-armed lever 31, 32 swingable about the shaft 38, said lever obtaining in a suitable manner a swinging movement by means of a rod connection 33. The shafts 49 of the rollers 42 driving the bands 44 are connected by means of bevel gears 48 with the driving shaft 38 and will thus be driven simultaneously with said shaft, the transmission ratio and the size of the rollers 39 and 42 being so chosen that the bands 40 and 44 will obtain the same speed.

The tobacco string thus fed is grasped, when leaving the conveyer bands 44, by a catching device consisting of two gripping members 21 having the form of plates or lists and being pivotally connected at 47 with a slide 7 movable on the machine frame 1, the free ends of said catching member being provided with bands 37 secured to and running about rollers 36 pivotally mounted on the machine frame. The said rollers 36 tend to turn through the action of springs or the like so that the bands 37 will always be held stretched. The gripping members 21 are actuated by a spring 41, Figs. 9, 11, 13—15, which tends to force the said members to the separated position shown in Figure 15. Crank levers 23, 25 are pivotally mounted on the frame, and the arms 25 of said levers interengage by means of teeth the arm 23 of one lever receiving movement at proper times from a rod connection 26, which movement is transmitted by means of the teeth to the other lever, so that the gripping members 21 will be moved together against the action of the spring 41 to the position shown in Figures 14 and 15. The slide 7 carrying the gripping members 21 is provided with a rack 46 cooperating with a toothed segment formed on the one arm 28 of the lever, which is rotatably mounted in the frame by means of a pivot 29 and the other arm 30 of which is connected by a link rod 27 with the one arm 31 of a driving lever 31, 32. The arm 31 is pivotally connected to a pawl 34, while the other arm 32 is pivotally connected to the rod 33, which obtains a reciprocating movement from the main shaft 100. The rod 33 is pivotally connected with the lower end of the arm 120 and carries a roller 119 engaging a cam race in the cam disk 117 on the shaft 100, while the upper end of the arm 120 is swingable on the stud 121. In swinging the said arm 31, 32 counter-clockwise, i. e., when the pawl 34 moves over the teeth of the ratchet wheel 35 the slide 7 with the gripping members 21 will thus be moved by means of the rod 27, the arm 30 with the toothed segment 28 and the teeth 46 in the direction towards the tobacco string fed forwards by the conveyer bands 40, 44, while, when turning the arm 31, 32 in opposite direction, the slide 7 with the gripping members 21 will be moved in the direction from the conveyer bands 44, which will simultaneously continue to move together with the band 40. In this case the length of the arms 30 and 31 ought to be so chosen that the gripping members 21 will obtain the same speed as that of the conveyer bands 40, 44, i. e. of the tobacco string fed forwards by said bands, thus preventing stretching or compressing, respectively, of the said string. By forming the gripping members 21 as plates or extensions and by providing said members at the free end with bands 37 having preferably the same height as have the gripping members and being stretched by the spring-actuated rollers 36, the tobacco string will have a reliable guidance, even after having left the conveyer bands 44. Each roller 36 is loosely mounted on its shaft 122 and the coil spring surrounding the shaft 122 has one end secured to the roller 36 and its other end secured to the plate 124, which is secured to the shaft 122. Arranged close to and on a level with the conveyer bands 40 is a cutting plate 22 serving, besides, as a stripper and which, as apparent from Fig. 10, extends onto a sleeve 20 secured to the machine frame, said plate covering partly the material in the one wall of the sleeve but leaving the whole opening free.

The filler tobacco adapted for the rolls to be produced is, as mentioned, introduced into the channel formed by the conveyer bands 40 and 44 and the said bands are put in an intermittent motion by the driving device 33, 34, 35. The tobacco string is fed forwards and caught by the gripping members 21 by which it will be moved over the cutting plate 22 to the cutting tool 10—14 located above said plate at the side of the sleeve 20. At this time the feeding motion of the tobacco string ceases and the slide 5 with the cutting tool 10—14 is moved downwards and cuts off a portion 15 from the string, Fig. 8, and simultaneously separates, by means of the extension 14, the roll 50 from the string 51 along the line 16. As apparent from Fig. 8, the fore end of the string 51 obtains thus a form corresponding to the top end of the roll 50 simultaneously cut off. The said roll 50 obtains the same form as that of the opening in the sleeve 20 into which it is now moved down by the action of the piston 18 and from which it will be automatically removed for further treatment in known manner. The slides 5 and 6 with the cutting tool 10—14 and the piston 18 are then moved upwards and simultaneously the gripping members 21 are moved on the arm 31, 32 in the direction towards the conveyer band 40, 44, the arms 23 being also actuated so that the gripping members separate by the action of the spring 41. After the gripping members 21 having reached their foremost position, they are again actuated by the arms 23 and will again grasp the tobacco string, the described process being then repeated. The conveyer channel formed by the bands 40, 44 may continuously be held packed with filler tobacco so that the manufacturing of the rolls may proceed continuously. The portions 15 cut off by the cutting sleeve 10—13 are automatically moved upwards through the sleeve from which they drop into an adjacent channel 17 and are removed.

Obviously the sleeve 20 adapted to receive the roll need not, as shown in the drawing, be arranged immediately below the cutting tool, as it is preferably displaced relatively to the cutting tool in the direction of feeding of the gripping members so that the introduction of the roll into said sleeve 20 will be performed after the said roll has been moved a step further in the feeding direction by the gripping members. Thus, according to this modification while a roll blank is cut off from the rope the roll blank cut off by the preceding action occupies a position between the gripping members, which lies nearer the pivot 47. In such a case the gripper members at those parts which seize the preceding roll blank, and which of course, in their front position lie opposite the sleeve, will have a form corresponding to the roll blank so that the said roll may not be injured or deformed before being moved down into the sleeve 20 by the piston 18.

The said rod 19, through which the piston 18 is driven, obtains its movement from a rotating main shaft 100 by the following device, Figs. 16, 17.

The shaft 100 is provided with a cam disk 101 which cooperates with a roller 103 carried by a fork 102 grasping over square piece 113 on the shaft 100, and the stem 104 of which is pivotally connected with the arm 105, which at its one end is pivoted to the frame part 106, while the other end thereof is pivotally connected to the rod 19.

The rod 16, through the reciprocating movement of which the cutting tool is moved, obtains its movement, Figs. 16, 17 from a cam disk 107 on the main shaft 100, the disk cooperating with a roller 108, which is journaled in a fork 109, which grasps over a square piece 113 on the shaft 100, and the stem of which is pivotally connected with an arm 111, which with its one end is pivoted to the frame part 106 and with its other end to the said rod 16.

The rod 26, through the movement of which the gripping members are opened, obtains its movement from the cam disk 112 on the main shaft 100, said disk cooperating with a roller 114, which is journaled in a vertical arm 115 swingably mounted with its lower end in a stud 116, secured to the frame part 3, while the upper end of arm 115 is pivotally connected to the said rod 26.

What we claim as new and desire to secure by Letters Patent of the United States of America is:—

1. A machine for making filler rolls for cigars from a string of filler tobacco, comprising means for cutting out roll blanks from said string, means for feeding the string into an operative position for the cutting tool, the part of the said feeding means adjacent the cutting means comprising a gripping device consisting of two members arranged one on each side of the string and moving in their longitudinal directions and to and from each other, means for causing said members after each severing operation of the tool to grip the string and feed the latter in position for the cutting tool, and then during the severing operation to support the string and keep the severed roll blank together in cooperation with the cutting tool.

2. In a machine for making cigar rolls, the combination of a conveyor device for feeding the tobacco string to be cut, a movable catching device for catching said tobacco string when leaving said conveyor device, and a movable cutting tool having a sleeve, through which excess tobacco is automatically removed in making shaped cigars, said catching device being so arranged as to advance the tobacco string intermittently into position for said cutting tool and as to enclose said tobacco string during the severing operation proper.

3. In a machine for forming filler rolls for cigars from a tobacco string, a movable cutting tool, a gripping device adapted to grip the tobacco string and advance the same intermittently into position for the cutting tool, and to enclose the tobacco string during the severing operation proper, said gripping device consisting of two reciprocating members pivotally connected to each other and having at their free ends bands extending over rotatable rollers, said bands being held stretched by springs actuating said rollers.

4. In a machine for making cigar rolls the combination of a conveyor device for feeding a tobacco string to be cut, a movable catching device for catching said tobacco string when leaving said conveyor device, and a movable cutting tool having a sleeve, through which excess tobacco is automatically removed in making shaped cigars, said sleeve consisting of two plates having bent edges, and means for holding said plates pressed against each other, said catching device being so arranged as to advance the tobacco string intermittently into position for said cutting tool and as to enclose said tobacco string during the severing operation proper.

5. In a machine for making cigar rolls, the combination of a conveyor device for feeding a tobacco string to be cut, a movable catching device for catching said tobacco string when leaving said conveyor device, and a movable cutting tool, said catching device comprising two reciprocating members pivotally connected to each other and bands connected to the free end of said members, rotatable rollers connected to said bands, and means for maintaining said bands stretched.

6. In a machine for making cigar rolls, the combination of a conveyor device for feeding a tobacco string to be cut, a movable catching device for catching said tobacco string when leaving said conveyor device, and a movable cutting tool, said catching device comprising two reciprocating members pivotally connected to each other and bands connected to the free end of said members, rotatable rollers connected to said bands, and means for maintaining said bands stretched, said catching device being so arranged as to advance the tobacco string intermittently into position for said cutting tool, and as to enclose said tobacco string during the severing operation proper.

7. A machine for cutting out filler roll blanks for shaped cigars from a tobacco string, comprising a movable cutting tool through which the excess tobacco cut out and rendered superfluous on account of the shape of the roll is automatically removed, and means for feeding said string into an operative position for the cutting tool.

8. A machine for cutting out filler roll blanks for shaped cigars from a tobacco string, comprising a movable cutting tool, said tool being shaped so as to form a guide, extending in the direction of the path of the tool and through which the excess tobacco cut out and rendered superfluous on account of the shape of the roll is automatically removed, and means for feeding said string into an operative position for the cutting tool.

9. A machine for cutting out filler roll blanks for shaped cigars from a tobacco string, comprising a movable cutting tool which is provided with a sleeve extending in the direction of the path of the tool and having a cross section which corresponds to the excess tobacco to be cut out, and means for feeding said string into an operative position for the cutting tool.

10. A machine for making cigar roll blanks for shaped cigars from a tobacco string, comprising means for cutting at intervals a wedge-shaped piece of the string as superfluous tobacco from one side of the string, and a device for feeding the string into an operative position for the cutting means.

11. A machine for cutting out filler roll blanks for shaped cigars from a tobacco string, comprising a movable cutting tool said tool being shaped so as to form a guide, extending in the direction of the path of the tool and through which the excess tobacco cut out and rendered superfluous on account of the shape of the roll is automatically removed, and means for feeding said string into an operative position for the cutting tool, said cutting tool including the guide consisting of two plates, one of which is formed with bent edges, the plates being held pressed against each other.

In testimony whereof we affix our signatures.

PER NORDENFELT.
ERIK GRANSTEDT.